UNITED STATES PATENT OFFICE.

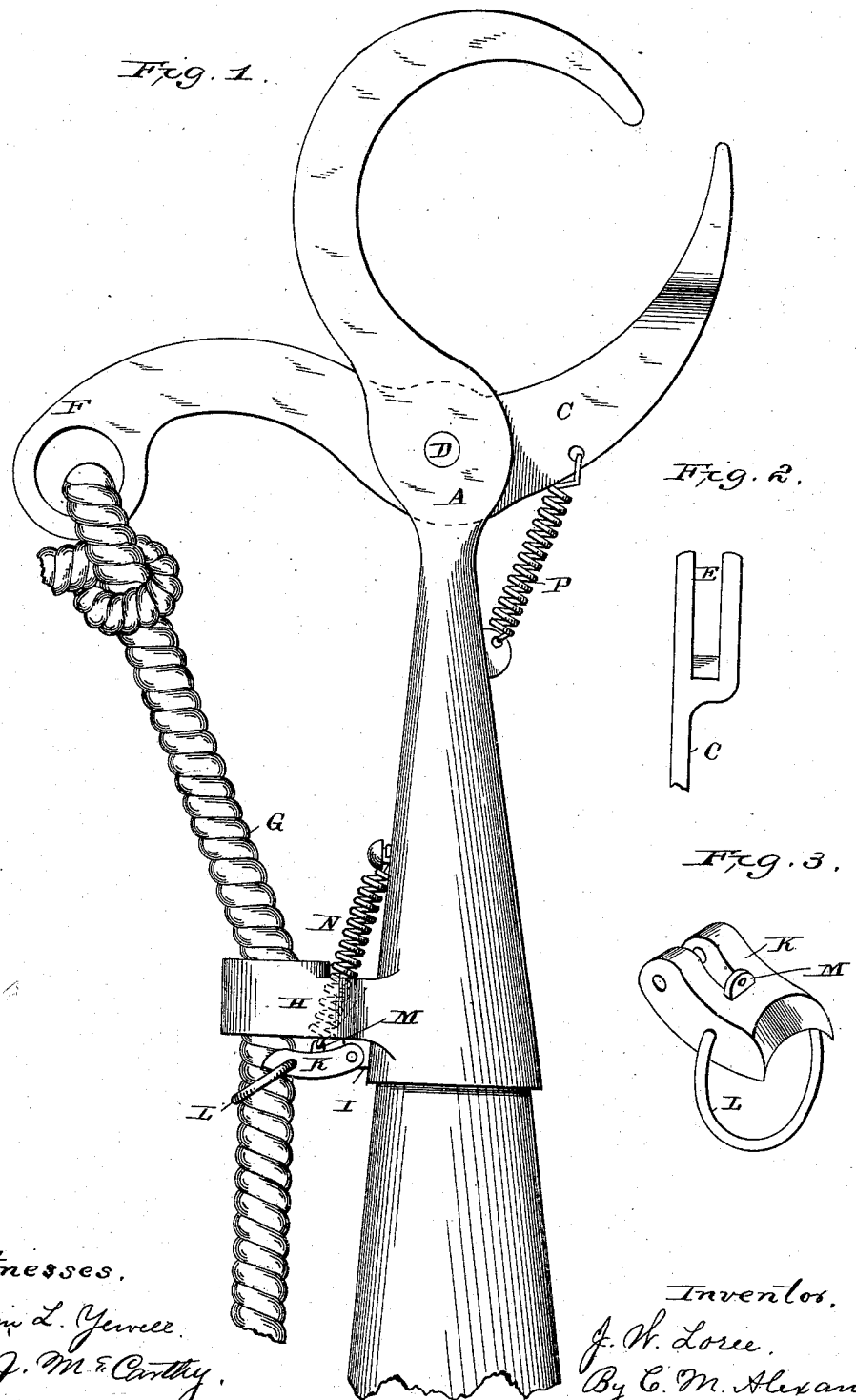

JOHN W. LOREE, OF FENWICK, MICHIGAN.

ANIMAL-CATCHER.

SPECIFICATION forming part of Letters Patent No. 265,113, dated September 26, 1882.

Application filed July 12, 1882. (No model.)

*To all whom it may concern:*

Be it known that I, JOHN W. LOREE, of Fenwick, in the county of Montcalm, and in the State of Michigan, have invented certain new and useful Improvements in Animal-Catchers; and I do hereby declare that the following is a full, clear, and exact description thereof, reference being had to the accompanying drawings, and to the letters of reference marked thereon, making a part of this specification.

This invention relates to certain improvements in that class of animal-catchers which are constructed with jaws to grasp the leg of the animal, one of the jaws being mounted upon a suitable pole, by means of which the device may be handled, and the other provided with a rope, by means of which the device may be operated to close upon the leg of the animal; and it has for its objects to provide for securing the rope after the leg of the animal has been grasped and prevent the jaws from opening, as more fully hereinafter set forth. These objects I attain by the means illustrated in the accompanying drawings, in which—

Figure 1 represents a side elevation of my improved device complete. Fig. 2 represents a detached view of a portion of one of the jaws, and Fig. 3 represents a detached perspective view of the rope-clutch.

The letter A indicates one of the jaws of my device, which is provided with a socket, by means of which it can be fitted on the end of a pole. C indicates the other jaw, which is pivoted to the jaw A at D. The said jaw C is bifurcated at its free end, as indicated by the letter E, Fig. 2, and is adapted to set over the point of the other when closed. The jaw C at one end is provided with an eye, F, to which is secured a rope, G, which passes through an eye formed in a bracket, H, on the socketed portion of the jaw A. The said socketed portion, directly below the bracket, is provided with a lug, I, to which is pivoted the slotted portion of the rope-clutch K, which is provided with a ring, L, through which the rope passes. The clutch is provided with an ear, M, to which is attached a spiral spring, N, which is fastened to the socketed portion of the jaw, the said spring holding and returning the clutch to a normal position. The letter P indicates a spring by means of which the jaws are held normally open.

It will be seen that when the device has seized an animal's leg and the rope has been drawn taut the struggles of the animal will tend to cause the clutch to hold the rope securely and prevent the escape of the animal. In order to insure the engagement of the rope, the edge of the clutch is made concave and beveled, as indicated in Fig. 3 of the drawings.

Having thus described my invention, what I claim, and desire to secure by Letters Patent, is—

The combination, with the pivoted jaws of an animal-catcher, one of which is provided with a bracket having an eye or aperture, of a rope secured to one jaw and passing through the bracket, a clutch pivoted below the bracket and adapted to bind against the rope, a ring secured to the clutch, through which the rope passes, and a spring for holding the clutch in normal position, substantially as specified.

In testimony whereof I affix my signature, in presence of two witnesses, this 16th day of June, 1882.

JOHN W. LOREE.

Witnesses:
R. W. HOY,
IRA C. H. SCOTT.